United States Patent [19]

Saitoh

[11] Patent Number: 5,054,528
[45] Date of Patent: Oct. 8, 1991

[54] VENTING DEVICE OF A FUEL TANK FOR A MOTOR VEHICLE

[75] Inventor: Shirou Saitoh, Yabuzukahonmachi, Japan

[73] Assignee: Fuji Jukogyo Kabushiki Kaisha, Tokyo, Japan

[21] Appl. No.: 497,498

[22] Filed: Mar. 22, 1990

[30] Foreign Application Priority Data

Apr. 19, 1989 [JP] Japan .................... 1-46143[U]

[51] Int. Cl.$^5$ .................... B65B 31/00; B65B 57/14
[52] U.S. Cl. .................... 141/59; 141/198; 137/587; 220/85 R; 220/85 VS
[58] Field of Search .................... 141/59, 44, 45, 46, 141/198; 220/85 VS, 85 VR, 86 R; 137/587

[56] References Cited

U.S. PATENT DOCUMENTS

| | | | |
|---|---|---|---|
| 2,544,651 | 3/1951 | Boardman | 137/587 |
| 3,189,039 | 6/1965 | Bauer | 141/198 |
| 3,706,319 | 12/1972 | Neese et al. | 141/59 |
| 4,673,009 | 6/1987 | Giacomazzi et al. | 141/198 |
| 4,760,858 | 8/1988 | Szlaga | 220/85 VS |
| 4,815,436 | 3/1989 | Sasaki et al. | 220/85 VR |
| 4,869,283 | 9/1989 | Oeffling et al. | 220/86 R |

FOREIGN PATENT DOCUMENTS 61-291218 12/1986 Japan .

Primary Examiner—Henry J. Recla
Assistant Examiner—Keith Kupferschmid
Attorney, Agent, or Firm—Martin A. Farber

[57] ABSTRACT

A float valve is provided on an upper wall of a fuel tank and arranged to close a first port formed in the upper wall with a float actuated by the fuel level in the fuel tank. A vent tube is provided for communicating the first port with the atmosphere through a carbon canister. A solenoid operated valve is provided adjacent the float valve. The solenoid-operated valve has a vertically movable plunger, a spring for biasing the plunger to a second port to close it and a solenoid for attracting the plunger upon energization thereof so as to open the second port. The plunger is arranged to engage with the float valve so as to open the first port when the solenoid is energized. A switch is provided in a filler pipe so as to be operated by a filler nozzle inserted in the filler pipe for energizing the solenoid.

3 Claims, 2 Drawing Sheets

VENTING DEVICE OF A FUEL TANK FOR A MOTOR VEHICLE

BACKGROUND OF THE INVENTION

The present invention relates to a fuel tank for a motor vehicle, and more particularly to a device for venting the fuel tank upon filling it with fuel.

Japanese Patent Application Laid Open 61-291218 discloses a fuel tank having a vent tube communicated with the atmosphere through a carbon canister, so that fuel supply to the fuel tank may be readily provided because of venting the tank.

FIG. 4 shows an improvement of such a fuel tank. A fuel tank 4 has a float valve 3, a first vent tube 1 connecting the float valve 3 with a carbon canister 10, and a second vent tube 1a connecting an upper portion of a filler pipe 6 with the first vent tube 1 through a solenoid operated valve 2 which is opened when fueling. The float valve 3 is arranged such that a float rises with the fuel to close an opening of the valve at a maximum level, thereby to close the vent tube to stop discharging the fuel from a filler nozzel 5, namely to stop the fuel supply.

In such a device, it may happen that the float does not fall because of sticking of the float, if the level of the fuel lowers, which disables the fuel supply. In addition, when the motor vehicle overturns and the vent tube 1 is cut off upstream of the solenoid-operated valve 2, a dangerous accident that the fuel flows out of the tank through the float valve may occur.

SUMMARY OF THE INVENTION

The object of the present invention is to provide a fuel tank in which a float chamber necessarily opens at fuel supply and leakage of the fuel is prevented.

According to the present invention, there is provided a vent device of a fuel tank for a motor vehicle, the fuel tank having a filler pipe, a float valve provided on an upper wall of the fuel tank and arranged to close a first port formed in the upper wall with a float elevated by a fuel level in the fuel tank, and a vent tube communicating the first port to the atmosphere through a carbon canister.

The vent device comprises a solenoid-operated valve provided adjacent the float valve and having a vertically movable plunger, a spring for biasing the plunger against a second port to close it, and a solenoid for retracting the plunger upon energization thereof so as to open the second port, the plunger being arranged to engage the float valve so as to open the first port when the solenoid is energized, and a switch provided in the filler pipe so as to be operated by a filler nozzle inserted in the filler pipe for energizing the solenoid.

In an aspect of the invention, the vent device further comprises another vent tube connecting an upper portion of the filler pipe to a third port provided in the solenoid operated valve so as to be closed by the plunger.

Other objects and features of this invention will become understood from the following description with reference to the accompanying drawings.

DETAILED DESCRIPTION OF THE PREFERRED EMBODIMENTS

Figure 1:
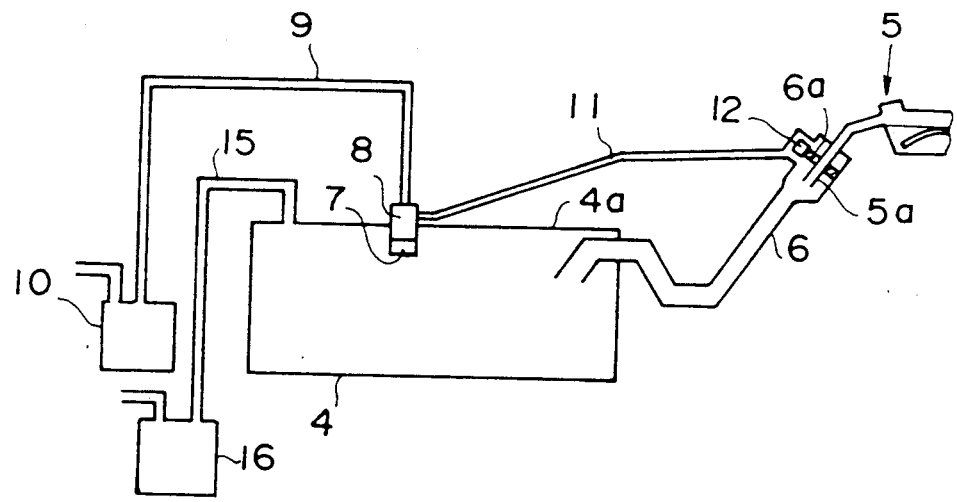
FIG. 1 is a schematic view showing a device according to the present invention.

Referring to FIG. 1, a fuel tank 4 is communicated with a carbon canister 10 through a float valve 7, a solenoid-operated valve 8, and a first vent tube 9. In an upper portion of a filler pipe 6, a seal device 6a is provided so as to operate a pressure sensitive automatic stop device provided in the filler nozzle 5. An end of a second vent tube 11 is connected to the filler pipe 6 at a position beneath the seal device 6a. Another end of the second vent tube 11 is connected to the solenoid-operated valve 8 so as to vent air in the upper portion of the filler tube to the carbon canister 10, as described after.

There is provided an ordinary vapor vent tube 15 and a carbon canister 16.

Figure 2A:
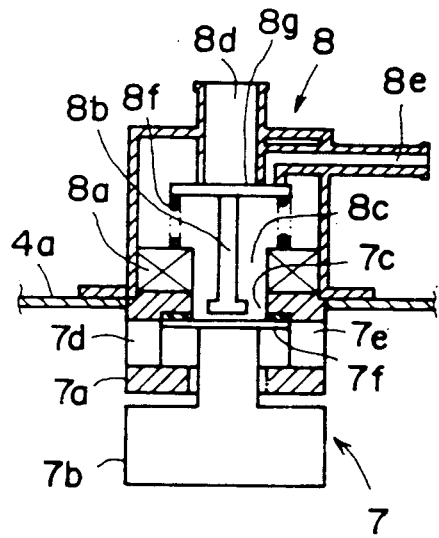
FIGS. 2a and 2b show solenoid operated valves in different operating positions respectively.
Figure 2B:
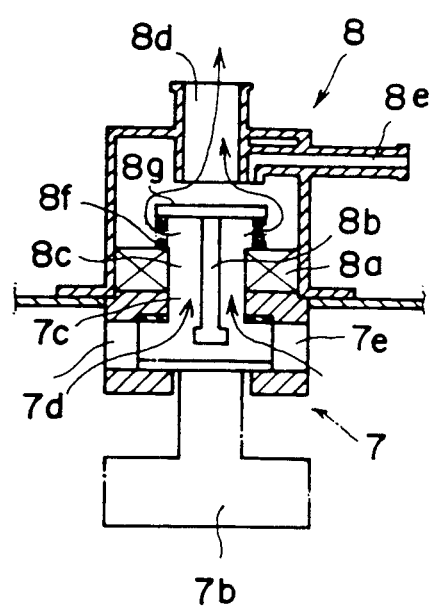

Referring to FIGS. 2a and 2b, the solenoid-operated valve 7 and the float valve 8 are integrated with each other and attached to an upper wall 4a of the fuel tank 4. The float valve 7 has a float 7b vertically slidably mounted in a housing 7a. The housing 7a has lower ports 7d and 7e communicated with an upper space in the fuel tank 4 and an upper port 7c which is closed by a valve disk 7f of the float 7b. When the float is at a lower position, the lower ports 7d and 7e are communicated with the upper port 7c as shown in FIG. 2b. When the float 7b is elevated by the fuel in the tank to a maximum level, the valve disk 7f abuts on the upper wall of the housing 7a to close the upper port 7c (FIG. 2a).

The solenoid-operated valve 8 has an upper port 8d connected to the first vent tube 9, an upper port 8e connected to the second tube 11, a lower port 8c communicated with the upper port 7c of the float valve 7 and a solenoid 8a. A plunger 8b having a valve disk 8g is vertically slidably mounted in the valve 8. The plunger 8b is upwardly biased by a spring 8f to close the ports 8d and 8e as shown in FIG. 2a. The plunger 8b is so designed that the lower end thereof is close to the valve disk 7f of the float valve 7 in the closing state of the valves 7 and 8 and that when the plunger 8b is downwardly attracted by the solenoid 8a to open the ports 8d and 8e, the lower end of the plunger pushes the valve disk 7f to open the port 7c.

In the upper portion of the filler pipe 6, a switch 12 is provided to be operated by a pipe 5a of the nozzle 5 when the nozzle 5 is inserted into the seal device 6a.

When the fuel level in the tank 4 falls from the maximum level, the float 7 lowers, thereby opening the port 7c. However, the ports 8a and 8e are closed by the valve disk 8g of the solenoid operated valve 8. When the filler nozzle 5 is inserted into the filler pipe 6 for filling the tank with gasoline, the switch 12 is operated by the nozzle 5a, exciting the solenoid 8a. Thus, the plunger 8b is retracted by the solenoid 8a against the spring 8f to open the ports 8d and 8e. Consequently, the fuel tank 4 is communicated with the canister 10 through the ports 7d, 7e, 8c, 8d and the first vent tube 9. The upper portion of the filler pipe 6 is also communicated with the canister through the second vent tube 11, the ports 8e and 8d and the first vent tube. At that time, even if the valve disk 7f of the float 7b sticks to the port 7c, the float 7 is necessarily pushed down by the plunger 8b to open the port 7c. Thus, the supplying of the fuel can be performed without obstruction.

When the fuel tank is filled with the fuel, the float 7b is raised by the fuel to push the plunger 8b against the force of the solenoid 8a to close the port 7c. When the fuel level in the filler pipe 6 reaches the end of the pipe 5a, the automatic stop device is operated to stop supplying the fuel. When the filler nozzle 5 is retracted from the filler pipe 6, the switch 12 is returned to the normal state to de-energize the solenoid, and hence the plunger 8b is upwardly biased by the spring 8f to close the port 8d.

Figure 3A:
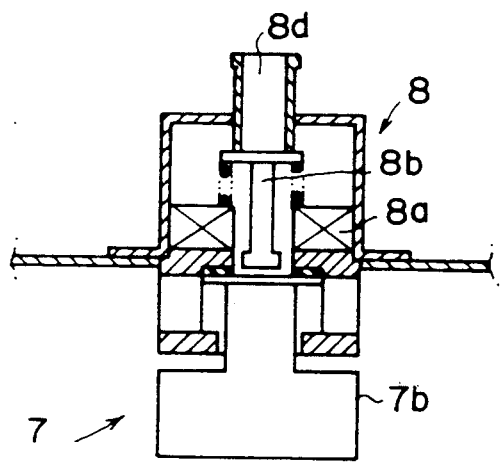
FIGS. 3a and 3b show another embodiment of the present invention.
Figure 3B:
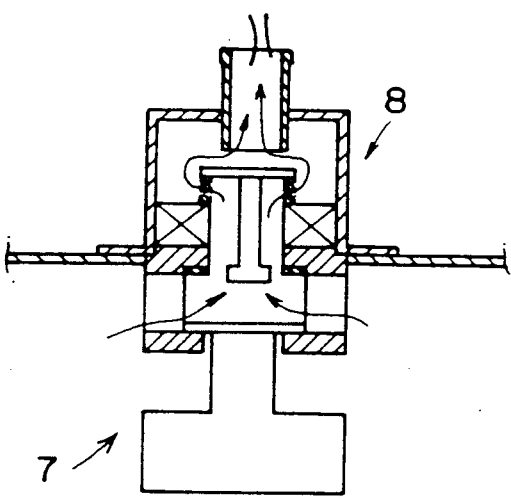
Figure 4:
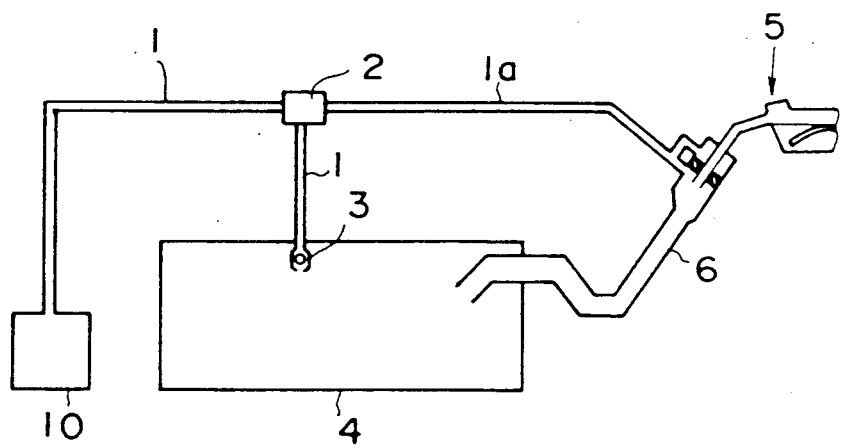
FIG. 4 is a schematic view of a conventional device.

Referring to FIGS. 3a and 3b showing another embodiment of the present invention, the second vent tube 11 and the port 8e in the first embodiment of the present invention are omitted. The rest of the construction is identical with that of the first embodiment, and the same parts are identified with the same reference as in FIGS. 2a and 2b.

Therefore, according to the first and second embodiments, the float valve 7 and the solenoid valve 8 (or 13) are integrated in one port, so that number of parts are decreased and the accuracy of the parts is increased.

As the vent tubes 9 and 11 are accurately opened whenever fueling, malfunctioning of the fueling operation is prevented. Even if the vehicle is overturned by accident to cut or disconnect the vent tube, no fuel leaks through the vent tube because the valve completely shuts at the highest position.

Herein the term "port" is also a passage, the latter word being used in the claims.

While the presently preferred embodiments of the present invention have been shown and described, it is to be understood that various changes and mofifications may be made without departing from the scope of the invention as set forth in the appended claims.

What is claimed is:

1. A vent device of a fuel tank for a motor vehicle, the fuel tank having a filler pipe, a float valve provided on an upper wall of the fuel tank and arranged to close a first passage formed in the upper wall with a float moved by a fuel level in the fuel tank, and a vent tube communicating to atmosphere via a carbon canister, comprising:

a solenoid-operated valve adapted to be mounted adjacent the float valve and having a second passage therein, a reciprocally movable plunger, spring means for biasing the plunger to close said second passage, and a solenoid for retracting the plunger by energization thereof so as to open the second passage, said second passage adapted to fluidly communicate the first passage to said vent tube;

the plunger being arranged to engage the float valve so as to open the first passage when the solenoid is energized; and a switch is adapted to be mounted in the filler pipe and operatively connected to said solenoid-operated valve so as to be operated by a filler nozzle inserted in the filler pipe for energizing the solenoid.

2. The vent device according to claim 1, wherein the solenoid-operated valve is integral with the float valve.

3. A vent device of a fuel tank for a motor vehicle, the fuel tank having a filler pipe, a float valve provided on an upper wall of the fuel tank and arranged to close a first passage formed in the upper wall with a float moved by a fuel level in the fuel tank, and a vent tube communicating to atmosphere via a carbon canister, comprising:

a solenoid-operated valve adapted to be mounted adjacent the float valve and having a second passage therein, a reciprocally movable plunger, spring means for biasing the plunger to close said second passage, and a solenoid by energization thereof for retracting the plunger so as to open the second passage, said second passage adapted to fluidly communicate the first passage to said vent tube;

the plunger being arranged to engage with the float valve so as to open the first passage when the solenoid is energized;

a switch is adapted to be mounted in the filler pipe and operatively connected to said solenoid-operated valve so as to be operated by a filler nozzle inserted in the filler pipe for energizing the solenoid; and another vent tube connecting an upper portion of the filler pipe to a third passage provided in the solenoid-operated valve so as to be closed by the plunger, said third passage is openable by the energization of the solenoid and adapted to fluidly communicate the first passage to said another vent tube.

* * * * *